United States Patent [19]

Ducret

[11] 4,103,578
[45] Aug. 1, 1978

[54] CABLE ARMOR CUTTING MACHINE

[76] Inventor: Lucien C. Ducret, 8 Apache Pl., Riverside, Conn. 06878

[21] Appl. No.: 703,669

[22] Filed: Jul. 8, 1976

[51] Int. Cl.² .............................................. B26D 7/02
[52] U.S. Cl. ..................................... 83/409; 30/90.3; 83/437; 83/464; 83/477.2; 83/924
[58] Field of Search ................ 83/924, 409, 437, 464, 83/477.2; 81/9.51; 30/90.3, 90.8, 91.1, 91.2

[56] References Cited
U.S. PATENT DOCUMENTS

| | | | |
|---|---|---|---|
| 2,176,646 | 10/1939 | Thatcher | 30/90.3 |
| 2,396,442 | 3/1946 | Shaver et al. | 30/90.3 X |
| 3,093,023 | 6/1963 | Vail | 30/90.3 X |
| 3,851,387 | 12/1974 | Ducret | 30/90.3 |
| 3,959,877 | 6/1976 | Zorzenon | 30/90.3 |

Primary Examiner—Frank T. Yost
Attorney, Agent, or Firm—DeLio and Montgomery

[57] ABSTRACT

A cutter for the armor of a BX cable or the like wherein the cable to be cut is held firmly in a cable guide by a manually actuated cable clamp, the clamped cable being movable into armor-cutting engagement with a fixed power driven circular saw.

2 Claims, 7 Drawing Figures

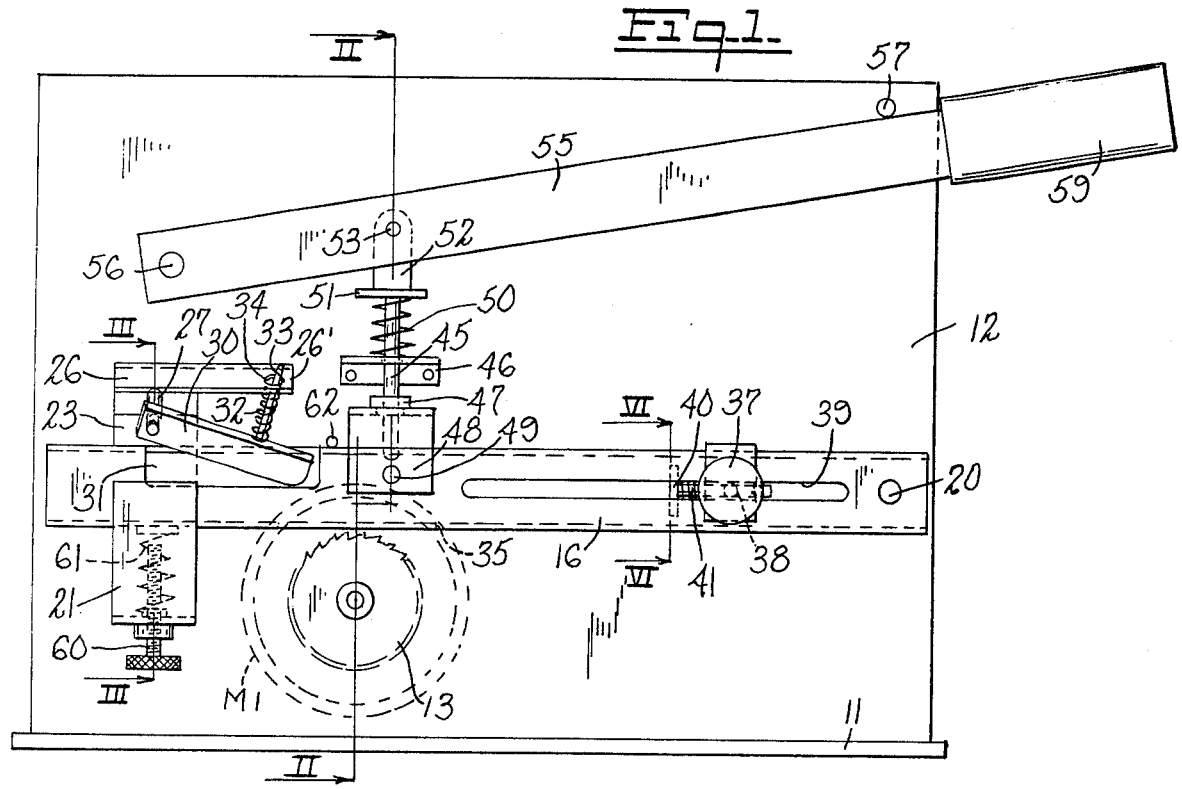
Fig. 1.
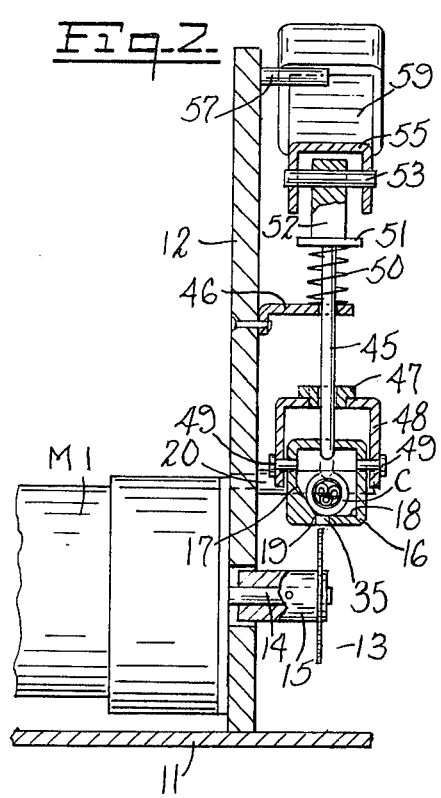
Fig. 2.
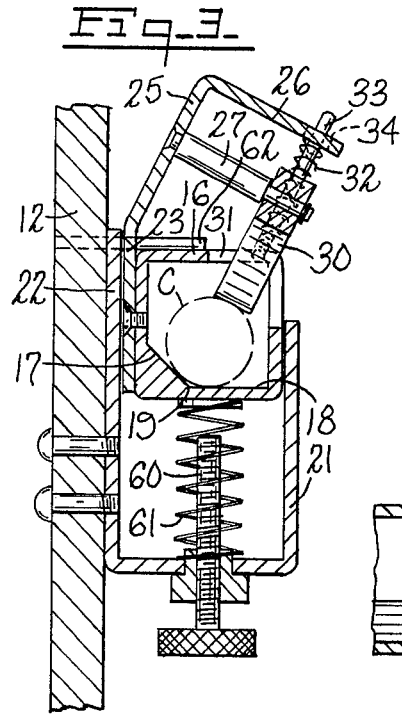
Fig. 3.
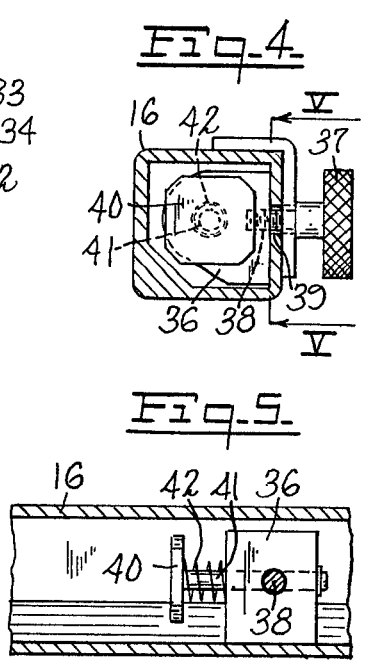
Fig. 4.
Fig. 5.

CABLE ARMOR CUTTING MACHINE

This invention relates to a cutter for the armor of a BX cable or the like comprising a stationary base or stand having a motor driven circular saw mounted thereon, a cable guide movable relative to the saw, a cable clamp associated with the cable guide and manually actuated means for clamping the cable in the guide and moving the guide and cable into a position where the saw can cut the cable armor.

Hand held and manually operated devices have been developed to replace the use of hack saws or files in the cutting of shielded conduits, such as BX cable and the like, so that the armor can be cut accurately, with precisely limited penetration (if any) into the cable. An example of such a device is shown in applicant's U.S. Pat. No. 3,851,387.

In certain manufacturing and/or assembly operations it may be necessary to cut and remove armor from the ends of a substantial number of pieces of BX cable, such that manual holding and sawing is arduous and time consuming.

It is accordingly an object of the invention to provide a motor driven cutting machine, adapted to receive and cut accurately the armor on BX cable in a range of sizes, wherein the only required manual effort consists in clamping the cable in proper position and moving the clamped cable against the saw blade.

It is a further object of the invention to provide a simple cable armor cutting machine carried by a base or stand which is readily portable or can be fixed to a bench or other support.

It is another oject of the invention to provide a cutting machine with readily accessible adjustable means for limiting the depth of cut.

It is a still further object of the invention to provide certain improvements in form, construction and arrangement of the several parts whereby the above-named and other objects may effectively be attained.

The invention accordingly comprises the features of construction, combination of elements and arrangement of parts which will be exemplified in the combination hereinafter set forth, and the scope of the invention will be indicated in the claims.

Practical embodiments of the invention are shown in the accompanying drawings, wherein:

FIG. 1 represents a side elevation of a first form of the tool;

FIG. 2 represents a vertical section on the line II—II of FIG. 1;

FIG. 3 represents a detail vertical section on the line III—III of FIG. 1;

FIG. 4 represents a detail vertical section on the line IV—IV of FIG. 1 showing the adjustable stop;

FIG. 5 represents a detail vertical section on the line V—V of FIG. 4;

Figure 6:
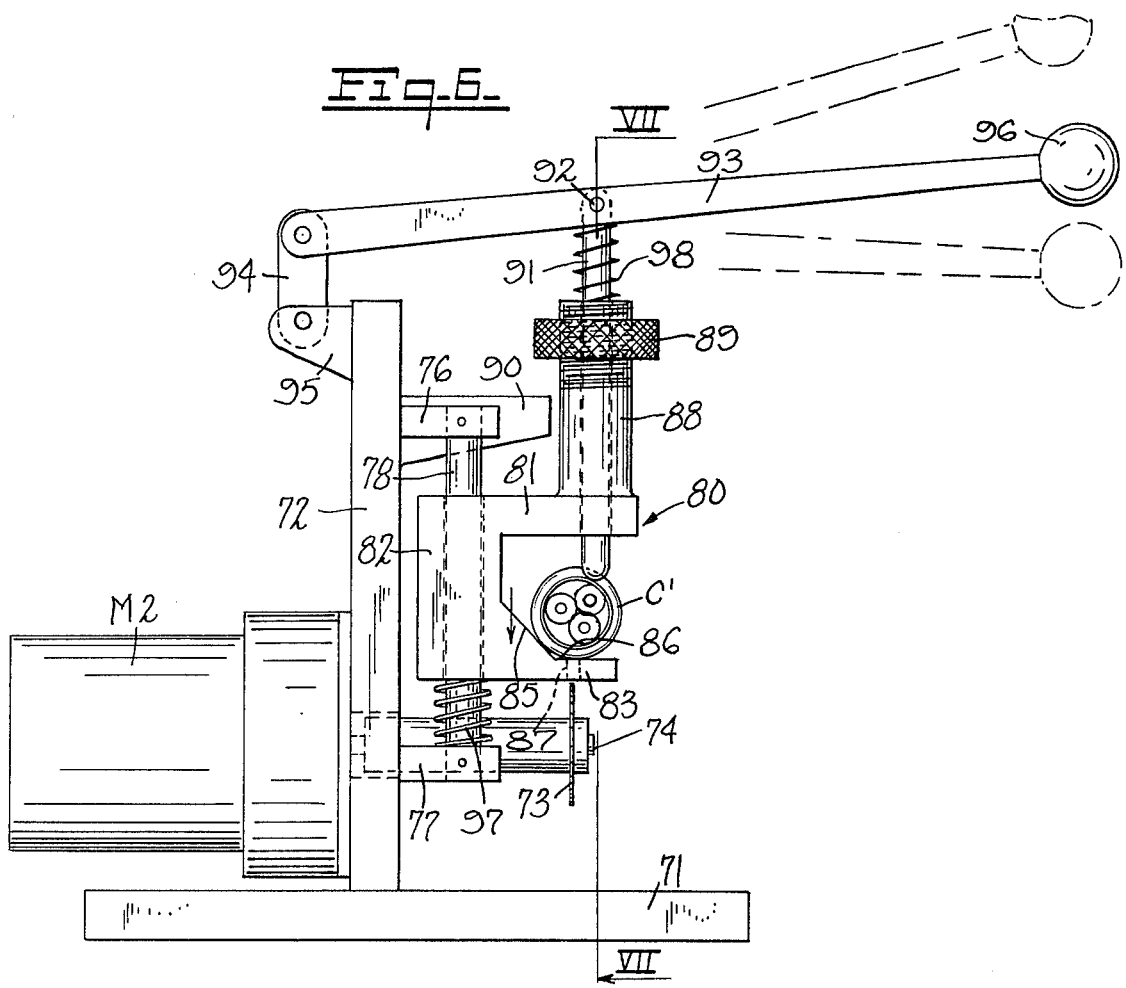
FIG. 6 represents an intake end elevation showing a modified form of tool.

Referring to the drawings, and particularly FIGS. 1 to 4, the cable cutter comprises a base plate 11 on which is mounted a vertical wall 12, as a support for all working parts of the machine.

The circular saw blade 13 is carried by the drive shaft 14 of a gear motor M-1, fixed on the back of the wall 12, the shaft 14 being journaled and pinned in a bushing 15 which passes horizontally through the wall and locates the saw blade at a suitable distance from the front face of the wall.

The cable guide 16 is an elongated tube of substantially square external cross-section, but with its lower inner corner beveled to provide a slanting surface 17 which lies at an angle of about 135° to the bottom surface 18, the junction of said surfaces forming an apex 19, toward which the cable to be cut is urged, as explained below. The apex angle may vary within the range of about 100° to 170°, as more fully explained in the cited U.S. Pat. No. 3,851,387, which shows in FIG. 5 the geometry of this feature. At one end of the guide 16, remote from the entrance end, it is pivotally mounted on a post 20, projecting horizontally from the wall 12, and the entrance end of the guide is arranged to be vertically movable in a U-shaped bracket 21, fixed on the wall 12. Another bracket, 23, is fixed to the rear wall of the cable guide in a position to slide past the rear leg 22 of the bracket 21, the second bracket having a portion 25 angled forwardly and upwardly, and an end portion 25 angled forwardly and downwardly, forming a right angle with portion 25. A pivot pin 27 projects from portion 25, parallel with portion 26, and constitutes the pivotal support for the cable centering arm 30. The upper and outer walls of the guide tube 16 are cut away in the region of the arm 30 to provide an opening 31, through which the arm can swing to bring and maintain its free end portion in contact with a cable C (FIG. 3). The arm is biased toward the cable by a spring 32 on a pin 33 which is fixed on the arm 30 and projects freely through a slot 34 in a rearward extension 26' of the bracket portion 26. The bottom wall 18 is longitudinally slotted at 35, just beyond the arm 30, to permit the saw blade to engage the cable armor.

The parts just described are so proportioned and arranged that the cable-restraining force of the arm 30, biased by spring 32, acts in a plane which contains the apex 19 and bisects the angle formed by surfaces 17 and 18 at said apex. A force exerted in that plane is effective to hold a cable in proper position regardless of the diameter of the cable or the actual angle at the apex within the range previously specified.

In order to expose a terminal portion of a BX cable, the armor must be cut at a predetermined distance from the cable end. Such distances may vary, depending on the requirements of each installation, and uniform spacing of a cut from the cable end can be ensured by means of the adjustable stop shown in FIGS. 4 and 5, comprising the block 36 which is slidable in the cable guide 16 and is adapted to be locked in place by means of the tightening knob 37 on the threaded stud 38 which projects from the side of the block through a long horizontal slot 39 in the side wall of the cable guide. It is desirable to provide the block 36 with a spring-loaded bumper 40, carried by a pin 41 which passes through a bore in the block 36 and is held resiliently in extended position by the spring 42. The wall of the cable guide may be calibrated to indicate adjusted positions of the stop assembly for any given spacing of the armor cut from the cable end.

In accordance with the normal operating sequence, a cable end which is inserted in the guide and urged by the centering arm 30 to rest against the guide walls 17 and 18, is stopped by the bumper 40 and then has its axial position fixed by the clamp shown in FIGS. 1 and 2. The clamp comprises a plunger 45 which passes freely through a bracket 46 (on the wall 12) and through the bushing guide 47 on a yoke 48, the sides of which engage pivotally, by pins 49, the opposite side walls of the cable guide. The lower end of the plunger is so located that it will bear against the upper surface of a cable of any size within the capacity of the tool. Above the bracket 46 the plunger is provided with a spring 50 between the bracket and a washer or flange 51, the top of the plunger being fixed to a block 52 which is journaled by a pin 53 within the channel-shaped operating lever 55. The lever 55 is pivoted at 56 to the wall 12 near the cable input end of the machine and extends the full length of the machine past a stop 57, to terminate in a handle 59, projecting beyond the end of the wall 12.

In addition to the length adjustment by the stop assembly 36–42, the depth of cut can be controlled by means of the adjusting screw 60 passing through the bottom of the bracket 21 and adapted to be contacted by the bottom of the cable guide. The guide is maintained normally in its upper, non-cutting position by means of a strong spring 61 on the screw 60 which holds the guide against the stop pin 62 projecting from the wall 12.

In operation, the stop assembly 36–42 is set to determine the distance of the cut from the cable end, and the screw 60 is set to determine the depth of cut (i.e. usually just enough to sever two adjacent turns of the armor, with minimal penetration of the cable insulation). With the motor running and saw rotating, the cable end is inserted into the cable guide, beneath the centering arm 30, a sufficient distance to bring it in contact with the bumper 40 which may yield slightly. The handle 59 is depressed, compressing spring 50 and causing the plunger 45 to engage firmly the top of the cable, biasing it against wall 17 in the same manner as shown in FIG. 6; further downward movement of the handle forces the cable and cable guard 16, pivoted at 20, downward relative to the saw blade against the force of spring 61) so that the saw enters the slot 35 and cuts the cable armor to a depth determined by the adjustment of screw 60. When pressure on the handle 59 is released the springs 50 and 61 will return the parts to the position shown in FIG. 1 and the cable may be withdrawn, the cut end of its armor now being readily removable.

A reason for the provision of the spring-loaded bumper 40, instead of a fixed stop, will be found in the fact that the BX cable presents a "corrugated" surface to the clamping plunger; if the end of the plunger hits a high point its engagement is unstable and if it hits a forwardly or rearwardly sloping area it will tend to cam the cable axially one way or the other. The limited resiliency of the bumper permits the cable end to adjust its position axially, by no more than half the width of a corrugation, to ensure firm engagement of the clamp with a low point on the cable surface, as illustrated in FIG. 7.

Figure 7:
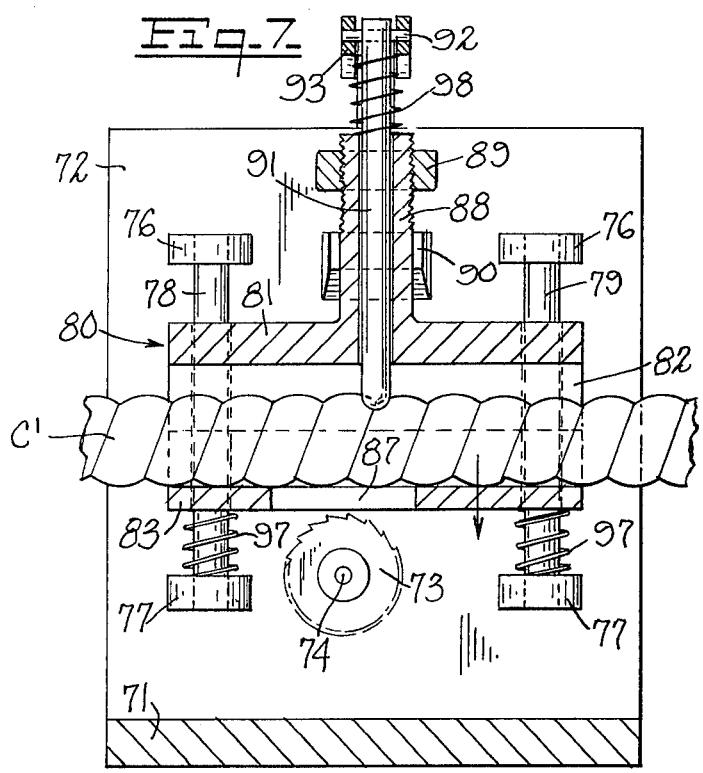
FIG. 7 represents a vertical section on the line VII—VII of FIG. 6.

A modified form of the tool is shown in FIGS. 6 and 7, wherein the cable centering means (arm 30) and the stop assembly 36–42 are eliminated. In this machine the base plate 71, vertical wall 72, motor M-2 and saw 73 on drive shaft 74 are similar to the corresponding parts described above, except that the plate and wall are shorter.

The wall 72 is provided with two pairs of horizontally projecting upper and lower lugs 76, 77, constituting supports for the vertical shafts 78, 79. The cable guide 80 is in the form of an open-faced block having a top wall 81, a rear wall 82 and a bottom wall 83, the rear wall being traversed by vertical bores through which pass the shafts 78, 79, with a free sliding fit. A slanting surface 85 between the inner surfaces of walls 82 and 83 corresponds to the surface 17 in FIG. 3 and provides an apex 86 corresponding to apex 19, described above. A slot 87 is formed in the bottom wall 83, parallel to and spaced slightly from the apex 86, the slot 87 being aligned vertically with the saw blade to permit the latter to engage the armor of a cable C' seated in the guide adjacent the apex.

An externally threaded bushing 88 extends upward from the top guide wall 81, a collar 89 with built-in friction being threaded onto the bushing and being adapted to contact a fixed stop 90 projecting from the face of the wall 72. The cable clamping plunger 91 passes through the bushing 88 in a position such that its bottom end can engage an average sized cable at a point substantially diametrically opposite the apex 86, as shown in FIG. 6. The upper end of the plunger is pivotally engaged at 92 with the operating lever 93, the latter being pivotally connected by a link 94 to a fixed bracket 95 on the rear face of the wall 72 and having a handle 96.

The guide 80 is urged upwardly by relatively strong springs 97 on the shafts 78, 79 and the operating lever 93 is urged upwardly by a softer spring 98 between the top of the bushing 88 and the handle, adjacent the pivot 92.

In operation, a cable C' is inserted laterally into the open-faced cable guide and the motor is started, simultaneously or squentially. The operating lever, being initially in its upper broken line position (FIG. 6) is depressed compressing the spring 98 and bringing the plunger 91 into engagement with the cable armor (FIGS. 6 and 7). Upon further depression of the operating lever the guide 80 slides down on the shafts 78, 79 compressing the springs 47 and bringing the armor into cutting engagement with the saw blade. The distance through which the guide can move is determined by the adjustment of the collar 89, the depth of cut being limited accordingly.

It will be noted that this tool can cut the armor at any point, regardless of proximity to a cable end. It is important also that, in each form of the tool, the effort required of the operator consists merely in overcoming, with favorable leverage, the resistance of one or more springs in order to clamp the cable at a selected point and then feed it to the saw blade, all by the single movement of depressing a lever.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

What I claim is:

1. A cable armor cutting machine comprising, a fixed support, a motor mounted on said support, a saw operatively connected to said motor, at least one vertical shaft mounted on the support, a cable guide slidable on said shaft toward and away from said saw, a cable clamping means movable into and out of engagement with the cable, and operating means adapted to move the clamping means into engagement with the cable and to move the cable into cutting engagement with the saw, the cable guide being a laterally open-faced block provided with a vertically disposed bushing, the clamping means being a plunger slidable in said bushing, and the operating means being a lever pivotally connected at one end to the fixed support.

2. A cable armor cutting machine according to claim 1 wherein the bushing is provided with adjustable stop means for limiting the downward movement of the guide toward the saw.

* * * * *